US007123943B2

(12) United States Patent
Ylitalo

(10) Patent No.: US 7,123,943 B2
(45) Date of Patent: Oct. 17, 2006

(54) METHOD OF GENERATING DIRECTIONAL ANTENNA BEAMS, AND RADIO TRANSMITTER

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 10/386,942

(22) Filed: Mar. 13, 2003

(65) Prior Publication Data

US 2003/0224828 A1 Dec. 4, 2003

Related U.S. Application Data

(63) Continuation of application No. PCT/FI01/00794, filed on Sep. 12, 2001.

(30) Foreign Application Priority Data

Sep. 13, 2000 (FI) ................................. 20002020

(51) Int. Cl.
*H04M 1/00* (2006.01)

(52) U.S. Cl. .................. 455/562.1; 455/561; 455/63.4; 455/67.16

(58) Field of Classification Search ............. 455/67.16, 455/562.1, 428, 60, 63.4, 13.3, 513; 370/334, 370/335; 342/383, 854, 354, 373
See application file for complete search history.

(56) References Cited

U.S. PATENT DOCUMENTS

| | | | | |
|---|---|---|---|---|
| 4,032,922 | A * | 6/1977 | Provencher | 342/373 |
| 4,410,894 | A | 10/1983 | Gans et al. | |
| 4,638,317 | A | 1/1987 | Evans | |
| 5,414,433 | A * | 5/1995 | Chang | 342/375 |
| 5,649,287 | A * | 7/1997 | Forssen et al. | 370/312 |
| 5,831,977 | A * | 11/1998 | Dent | 370/335 |
| 5,859,610 | A * | 1/1999 | Lenormand et al. | 342/354 |
| 5,952,968 | A * | 9/1999 | McDowell | 342/383 |
| 5,963,165 | A * | 10/1999 | Das | 342/353 |
| 6,009,335 | A * | 12/1999 | Murphy | 455/423 |
| 6,151,513 | A * | 11/2000 | Petry et al. | 455/562.1 |
| 6,546,259 | B1 * | 4/2003 | Vendryes | 455/513 |
| 6,580,701 | B1 * | 6/2003 | Ylitalo et al. | 370/334 |
| 2002/0196185 | A1 * | 12/2002 | Bloy | 342/435 |
| 2003/0076258 | A1 * | 4/2003 | Chang et al. | 342/373 |

FOREIGN PATENT DOCUMENTS

| | | |
|---|---|---|
| WO | WO 98/36471 | 8/1998 |
| WO | WO 98/50981 | 11/1998 |

* cited by examiner

*Primary Examiner*—Matthew Anderson
*Assistant Examiner*—Tan Trinh
(74) *Attorney, Agent, or Firm*—Squire, Sanders & Dempsey L.L.P.

(57) ABSTRACT

A method of forming directional antenna beams, comprising: directing at least two antenna beam signals by means of a beam formation matrix and pre-phasing pre-determined antenna beam signals formed with an antenna array in such a way that the signal of at least one antenna beam has a different phase compared with the signals of other antenna beams. The pre-phasing is implemented with a pre-phasing element, which comprises phasing coefficients in digital implementation. The pre-phasing element is implemented in such a way, for example, that the power of the sum signal of the antenna elements is evenly distributed to the different antenna elements in a pre-determined variation range.

23 Claims, 4 Drawing Sheets

METHOD OF GENERATING DIRECTIONAL ANTENNA BEAMS, AND RADIO TRANSMITTER

This application is a continuation of international application PCT/FI01/00794 filed Sep. 12, 2001 which designated the US and was published under PCT article 21(2) in English.

FIELD OF THE INVENTION

The invention relates to a method of pre-phasing antennas in an antenna array to achieve power balance at pre-determined accuracy and/or of directing intermediate beams.

BACKGROUND

In the future, when the number of users of cellular radio networks increases and rapid data transmission in these systems becomes increasingly common, an increase in the capacity of the system by improving the performance of the system becomes essentially important. One solution to this problem is the use of one or more adaptive antenna arrays instead of sector antennas. In an antenna array, single antenna elements are positioned typically close to each other, i.e. at about half a wavelength from each other. Typically, to facilitate the Fourier conversion, the number of antennas in such arrays is divisible by two and sufficiently large to achieve a desired coverage area. The basic principle of the method is to use narrow radiation beams that are directed towards the desired receiver as directly as possible. In the use of adaptive antenna arrays, the methods generally known can be divided into two main groups: directing radiation groups towards the receiver, or selecting the most suitable one of alternative beams. For the purpose of uplink transmission, a suitable beam is selected, or a beam is turned on the basis of the information received from the uplink. Reuse of frequencies can be made more efficient and the power of transmitters decreased, because interference caused to other users is reduced owing to the directivity of antenna beams.

The direction of antenna beams is typically implemented in a digital system by means of a digital beam formation matrix, for example a digital Butler matrix. A signal is divided in baseband parts into I and Q branches, and the signal of each antenna element is multiplied in a complex manner, i.e. phase and amplitude, by appropriate weighting coefficients, and after that, all output signals of the antenna elements are summed up. An adaptive antenna array comprises in this case not only antennas but also a signal processor, which automatically adapts antenna beams by means of a control algorithm by turning antenna beams in the direction of the most powerful signal measured.

A problem with generating antenna beams with a digital beam formation matrix of the prior art is that the phasing of antenna signals is performed as proportional relative to a reference antenna, in general the first antenna element in the array. Thus, the antenna elements in the array are phased relative to the reference antenna element but not relative to other antenna elements in the array. This leads to great power variations between the antenna elements in the array, which, in turn, leads to problems in the dimensioning of power amplifiers, for example in such a way that the power amplifier of one antenna element is much larger than the power amplifiers of the other antenna elements. Amplifiers that are powerful and as linear as possible are also expensive.

The directivity of beams can also be implemented analogically by generating orthogonal radiation beams by means of Butler matrices and fixed phasing circuits, in which beams the phase increases antenna by antenna. The method measures which beam receives the most signal energy, i.e. where the signal is most powerful, and this beam is selected for transmission. A problematic situation arises when the antenna beams are generated with a phase-shift network according to the prior art and the users of the radio network are spread unevenly over the areas of different antenna beams. The worst case possible is that all radio resource users are within the coverage area of the same beam, in which case in an antenna array with four antenna elements, quadruple power is required for one beam. Thus, the situation is the same as in a system with one antenna, so that array antenna gain is lost.

BRIEF DESCRIPTION OF THE INVENTION

An object of the invention is to implement an improved beam formation matrix. This is achieved with a method of forming directional antenna beams, comprising: directing at least two antenna beam signals by means of a beam formation matrix. In the method, pre-determined antenna beam signals formed with an antenna array are pre-phased in such a way that the signal of at least one antenna beam has a different phase compared with the signals of other antenna beams.

Further, an object of the invention is a radio transmitter implementing the method, comprising a beam formation element. In the radio transmitter, the beam formation element is connected to at least one pre-phasing element, by means of which pre-phasing element pre-determined antenna beam signals formed with an antenna array are pre-phased in such a way that the signal of at least one antenna beam has a different phase compared with the signals of other antenna beams.

Preferred embodiments of the invention are disclosed in the dependent claims.

An advantage of the method and system according to the invention is that the power can be distributed evenly between the different antennas in the antenna system in accordance with a pre-determined variation range. Thus, a similar or even the same power amplifier can be used for all antenna signals. This simplifies designing of the antenna systems and reduces a need for an amplifier that would have to be of high power and as linear as possible. With the method according to the invention, intermediate beams can also be generated between the antenna beams, by means of which intermediate beams transmission power can be directed more accurately towards the desired object, for example a subscriber terminal in a cellular radio system. Further, a beam shape covering the whole antenna sector is achieved with the method according to the invention when the same signal is transmitted to all antenna beams, for example a common pilot signal of the UMTS system.

BRIEF DESCRIPTION OF THE FIGURES

The invention will now be described in greater detail in connection with preferred embodiments of the invention, with reference to the attached drawings, in which.

DESCRIPTION OF EMBODIMENTS OF THE INVENTION

Figure 1:
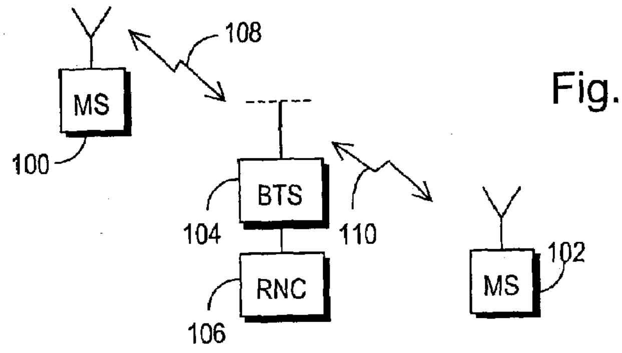
FIG. 1 illustrates an example of a telecommunication system.

The present invention can be used in different wireless communication systems, such as in cellular radio systems. The multiple access method used has no significance. For example, the CDMA (Code Division Multiple Access), WCDMA (Wideband Code Division Multiple Access) and TDMA (Time Division Multiple Access) or their hybrids can be used. It will also be obvious to a person skilled in the art that the method according to the invention can also be applied to systems utilizing different modulation methods or air interface standards. FIG. 1 shows in a simplified manner one digital data transmission system to which the solution according to the invention can be applied. This is a part of a cellular radio system comprising a base station 104, which is in radio connection 108 and 110 with the subscriber terminals 100 and 102, which can be fixedly positioned, positioned in a vehicle, or portable terminals that the user can carry with himself. The base station comprises transceivers. There is a connection from the transceivers of the base station to an antenna unit with which the radio connection to the subscriber terminal is implemented. The base station is further connected to a base station controller 106, which transmits the terminal connections to the rest of the network. The base station controller controls in a centralized way several base stations connected thereto. A control unit in the base station controller performs call control, mobility management, collection of statistical data, and signalling.

The cellular radio system can also be in connection with a public switched telephone network, whereby a transcoder converts the different digital coding forms used between the public switched telephone network and the cellular radio network to be compatible with each other, for instance a fixed network form of 64 kbit/s into a cellular radio network form (for instance 13 kbit/s), and vice versa.

Figure 2A:
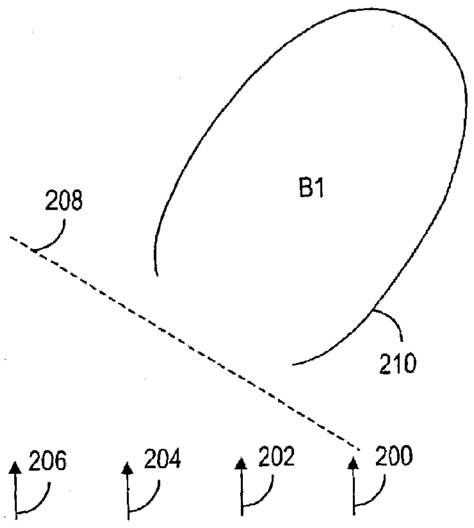
Fig.2A Prior Art
FIGS. 2*a* to 2*c* illustrate an example of a prior art beam formation by means of a Butler matrix.
Figure 2B:
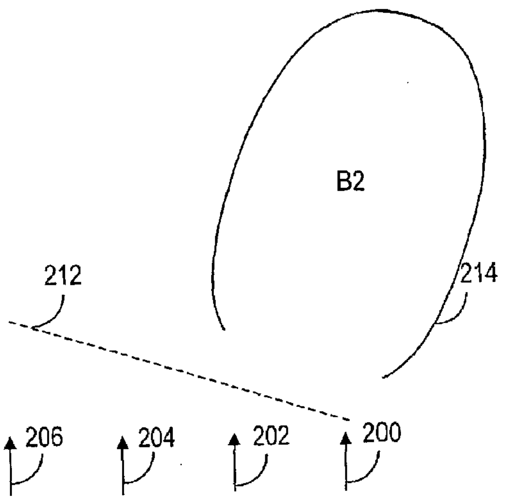
Fig. 2B Prior Art
Figure 2C:
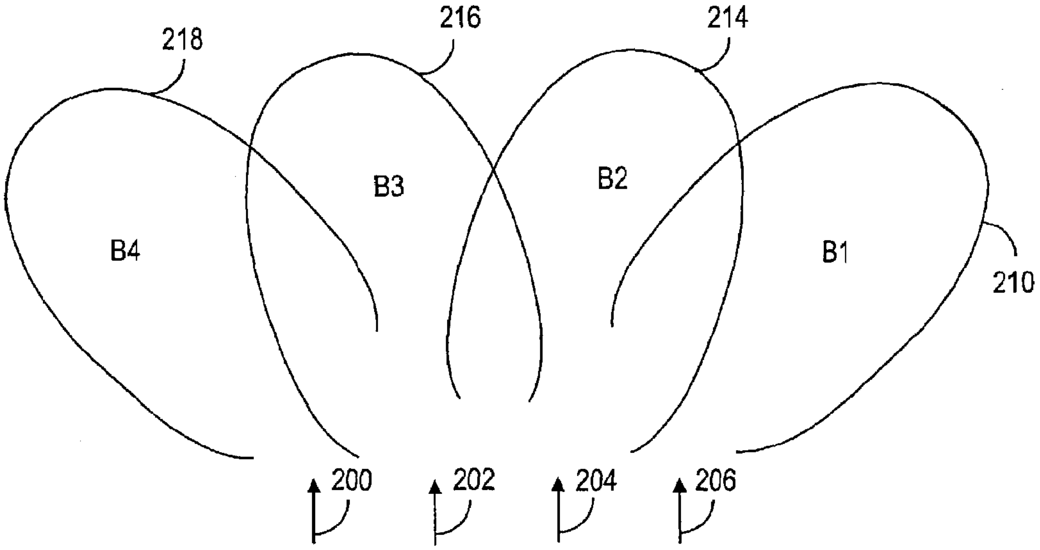
Fig. 2C Prior Art

FIGS. 2*a* to 2*c* show an example of beam formation according to the prior art by means of a Butler matrix. Typically, the beams are orthogonal. The antenna signals are phased by means of a Butler matrix in such a way that the beams are directed in a desired direction, preferably in the direction from which the most powerful signal has been received. In an analogue implementation, the phasing is achieved with a phase-shift network. In a digital implementation, the signal is typically divided in baseband parts into I and Q branches, after which the divided signal is multiplied by weighting coefficients. The weighting coefficients are typically in the form $Ae^{j\phi}$, in which A denotes amplitude and $\phi$ denotes phase difference. In the reception, the phased output signals of the antenna elements are summed up in a beam-specific manner. In the transmission direction, the phased antenna signals are summed up on the radio path in a coherent manner in the main direction of each beam. The phasing is achieved by defining a phase difference for the signals, the phase difference being implemented by delaying different signals in different ways. In the signal phasing, the signal of the first antenna is not delayed, and the signals of other antennas are delayed proportioned to the signal of the first antenna in such a way that the phase difference $\phi$ is increased antenna by antenna.

The phase difference in the antenna element i compared with the first element of the array is proportional to a distance d of the first element of the array in accordance with the formula $$\phi_i = \frac{2\pi}{\lambda} i \cdot d \cdot \sin\varphi, \tag{1}$$

where

λ=wavelength of an antenna signal (carrier wave);

i=number of antenna elements in the array;

d=distance between different antenna elements;

ϕ=angle at which the antenna beam is directed.

TABLE 1

| Beam | phase antenna 1 | phase antenna 2 | phase antenna 3 | phase antenna 4 |
|---|---|---|---|---|
| B1 | 0 | 3πλ/4 | 6πλ/4 | 9πλ/4 |
| B2 | 0 | πλ/4 | 2πλ/4 | 3πλ/4 |
| B3 | 0 | −πλ/4 | −2πλ/4 | −3πλ/4 |
| B4 | 0 | −3πλ/4 | −6πλ/4 | −9πλ/4 |

Table 1 shows Butler matrix phase values for four different antenna beams. These phase differences bring about orthogonal beams.

In accordance with the example shown in Table 1, a first beam B1, in FIG. 2*a* 210, is formed in such a way that the signal of a first antenna element 200 of the array is not delayed; the signal of a second antenna element 202 is delayed 3πλ/4 times the signal wavelength; the signal of a third antenna element 204 is delayed 6πλ/4 times the signal wavelength; and the signal of a fourth antenna element 206 is delayed 9πλ/4 times the signal wavelength. The signals of different phases in all antenna elements are summed up on the radio path into beam B1 210. In FIG. 2*a*, the broken line 208 denotes the proportion of the signal delays in different antenna elements 200, 202, 204, 206 to the first antenna element of the antenna array. FIG. 2*a* shows the increase in the delays of different antenna elements and the direction of the beam B1 210.

A second beam, in FIG. 2*b* 214, is formed in such a way that the signal of the first antenna element 200 of the array is not delayed; the signal of the second antenna element 202 is delayed π/4 times the signal wavelength; the signal of the third antenna element 204 is delayed 2π/4 times the signal wavelength; and the signal of the fourth antenna element 206 is delayed 3π/4 times the signal wavelength. The signals of different phases in all antenna elements are summed up on the radio path into beam B2 214. In FIG. 2*b*, the broken line 212 denotes the proportion of the signal delays in different antenna elements 200, 202, 204, 206 to the first antenna element of the antenna array. FIG. 2*b* shows the increase in the delays of different antenna elements and the direction of the beam B2 214.

When the beam B1 210 of FIG. 2*a* is compared with the beam B2 of FIG. 2B, it can be seen that the beams B1 and B2 are directed in different directions due to different phasing of antenna signals.

FIG. 2*c* shows a system with four antenna beams. In FIG. 2*c*, beams B1 210 and B2 214 are the same as in FIG. 2*a*. Beams B3 216 and B4 218 have been provided by delaying antenna signals in accordance with Table 1. Beam B1 is directed at direction $\phi_1$, beam B2 is directed at direction $\phi_2$, beam B3 is directed at direction $-\phi_2$, and beam B4 is directed at direction $-\phi_1$.

The values of phase angles, the number of antennas and antenna beams and the form of antenna beams can be different from those shown in FIG. 2 and Table 1; there may be for instance 8 antenna beams, whereby correspondingly, the phase angles deviate from what was described above. It is to be noted that the beams can be formed by means of a digital beam formation matrix other than the Butler matrix, or the beams can be formed analogically.

In a method of forming directional antenna beams, a signal of one or more antenna beams is phased prior to digital beam formation with a pre-phasing element comprising antenna-beam-specific phasing coefficients in such a way that at least one antenna beam signal has a different phase compared with the other antenna beam signals. After the pre-phasing, the signals are taken to a beam formation element according to the prior art, which is, for instance, a digital Butler matrix, in which antenna beams are formed.

The purpose of pre-phasing is either to distribute the power of the sum signal of the antenna elements evenly in a pre-determined variation range to the different antenna elements, or to direct the power of the intermediate beams formed between the antenna beams in a determined direction, for instance in the direction of a positioned subscriber terminal. Several positioning methods of a subscriber terminal are known, for example determining the input angles and/or angular spread of the received signal. A pre-phasing method can be applied irrespective of which positioning method is selected.

There are several alternatives for phasing coefficients; for instance, if the antenna array comprises 4 antenna elements, an appropriate series of phase differences can be selected with a step of $\pi/4$ from $7^4$ alternatives. If there are 8 antenna elements, with a step of $\pi/8$, there are $15^8$ phase difference alternatives. Smaller phase steps may also be used.

Appropriate phasing coefficients for each situation are found with numeric computation. Table 2 shows one example of phasing coefficients of a phasing element in an antenna array with 4 antenna elements or in an antenna array of 8 antenna elements, with which the power can be evenly distributed in a pre-determined variation range to all antenna elements of the antenna array. In the table, λ denotes the wavelength of the signal to be phased.

TABLE 2

| Beam | phase difference Φ (4 beams) | phase difference Φ (8 beams) |
|---|---|---|
| B1 | 0 | $5\pi\lambda/8$ |
| B2 | $-\pi\lambda/4$ | $5\pi\lambda/8$ |
| B3 | 0 | $-7\pi\lambda/8$ |
| B4 | $3\pi\lambda/4$ | $-3\pi\lambda/8$ |
| B5 | | $5\pi\lambda/8$ |
| B6 | | $-3\pi\lambda/8$ |
| B7 | | $-7\pi\lambda/8$ |
| B8 | | $5\pi\lambda/8$ |

The phasing coefficient can comprise only a phase coefficient Φ, or it can comprise a phase coefficient Φ and an amplitude coefficient A, whereby also the amplitude of the signal can be changed.

The phasing coefficients can be kept constant or they can be reselected, for instance at certain time-slots, or on the basis of power measurement results of signals entering the power amplifier or on the basis of positioning measurements of the receiver. For example, as the power balance between different antenna elements is deteriorated, the required number of coefficients is changed in order to improve the balance; or as the subscriber terminal moves, the power is directed at a desired intermediate beam.

Selection of phasing coefficients is influenced by, for instance, the number of antenna elements in the antenna array, the modulation method used in the radio system, and the variation range determined for a beam covering the whole sector.

It is to be noted that the above-described pre-phasing method allows coverage for the whole antenna sector to be achieved by transmitting the same signal to all beams.

FIGS. 3*a* to 3*d* show, by way of example, antenna beams generated by means of an antenna-phasing method. In FIGS. 3*a* to 3*d*, the direction of the antenna beams 304, 306, 308 and 310 remains the same.

Figure 3B:
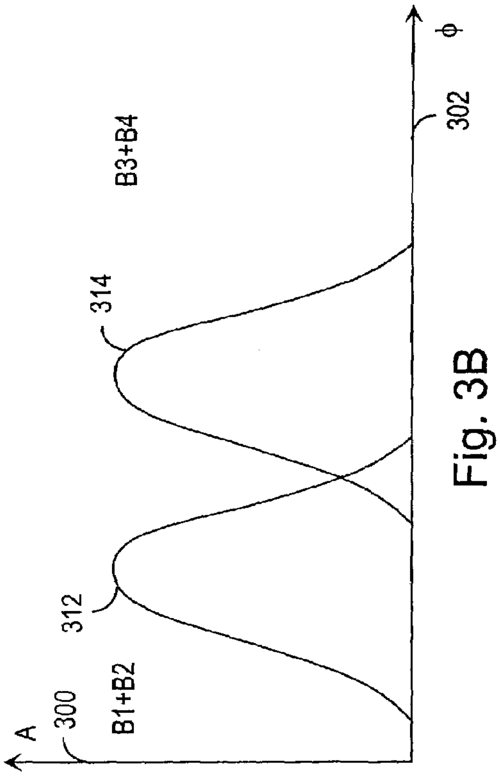
FIGS. 3*a* to 3*d* illustrate an example of pre-phasing of antenna beams.
Figure 3A:
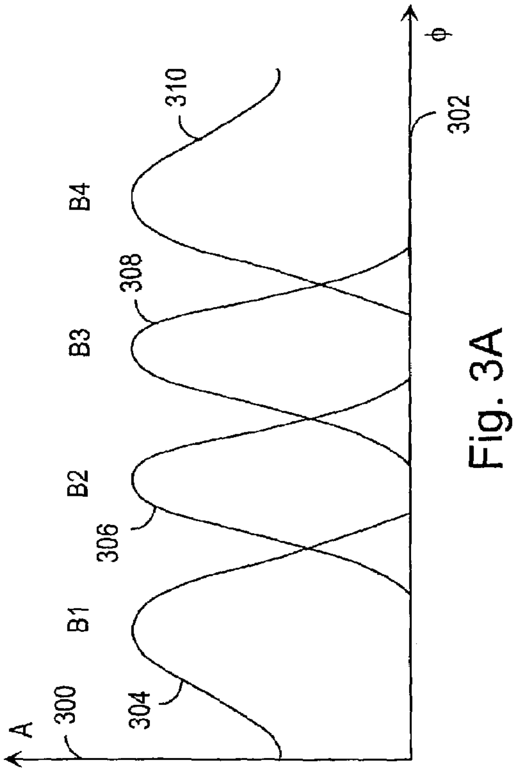

FIG. 3*a* shows four antenna beams B1 304, B2 306, B3 308 and B4 310. A vertical axis 300 denotes amplitude and a horizontal axis 302 denotes the directional angle of the beam.

FIG. 3*b* shows intermediate beams B1+B2 312 and B3+B4 314 of adjacent beams. These intermediate beams are provided when the same signal is fed to beams forming an intermediate beam. In the case of FIG. 3B, the same signal is fed to the beams B1 304 and B2 306, and correspondingly to beams B3 308 and B4 310.

Figure 3D:
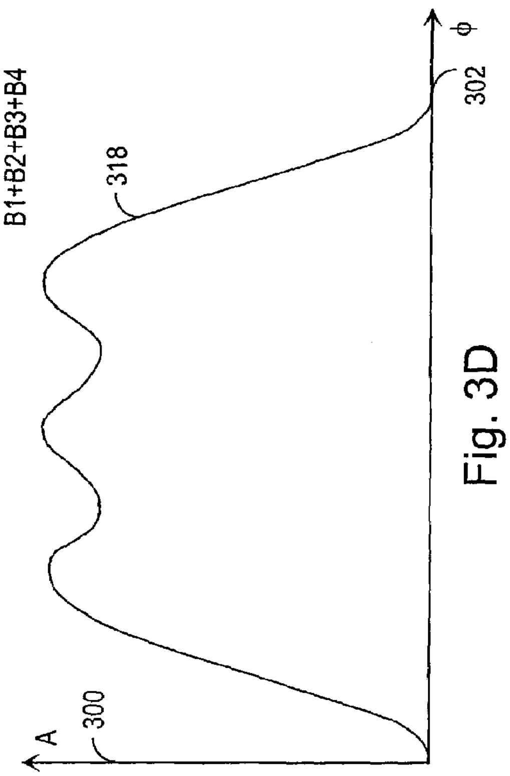
Figure 3C:
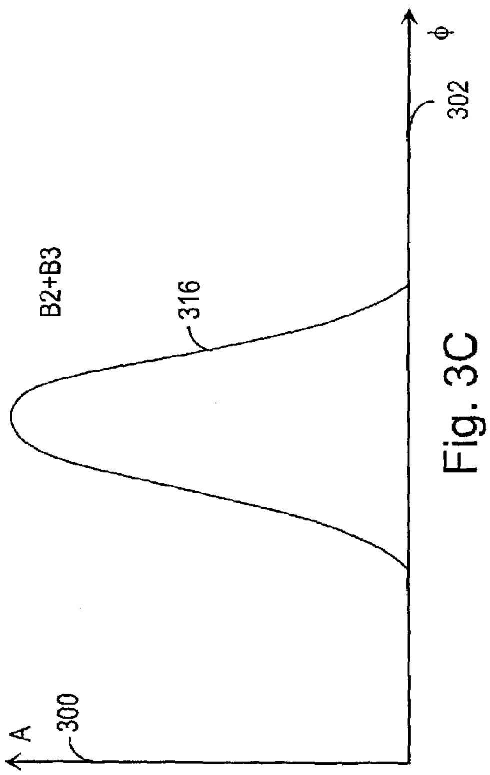

FIG. 3*c* shows an intermediate beam 316 of adjacent beams B2 306 and B3 308. Also this intermediate beam is provided when the same signal is fed to beams forming an intermediate beam. It can be seen from FIGS. 3*b* to 3*c* that the intermediate beams are positioned between the generation beams 304 and 306; 308 and 310; and 306 and 308, whereby the antenna power can be directed at the desired receiver or transmitter without redirecting the actual antenna beams. By selecting beams and phasing coefficients/amplitude coefficients suitable for generating intermediate beams, the desired power, direction and shape are provided for the intermediate beam.

FIG. 3*d* shows how a beam 318 covering the whole antenna sector is provided by feeding the same signal to all beams 304, 306, 308 and 310. It can be seen from FIG. 3*d* that the maximum power of the beam varies wavingly. This variation range of the maximum power can be controlled by the selection of the phasing coefficient.

It is to be noted that the properties of the radio system, such as the modulation method selected and also the number of antenna elements in the antenna array, affect the shape of the beams and the waving of the maximum power.

Above, digital implementation of the pre-phasing method with phase coefficients is described. In the analogue implementation, the pre-phasing is implemented with a phase-shift element, such as with a phase-shift network according to the prior art or with a delay line according to the prior art.

Figure 4:
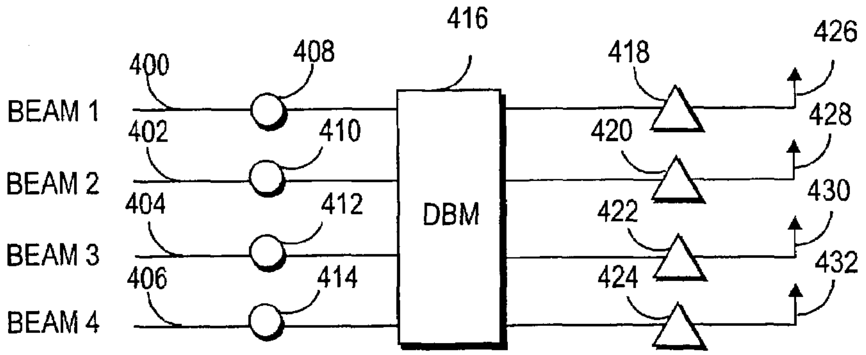
FIG. 4 illustrates an example of an arrangement for pre-phasing a transmission antenna beam.

FIG. 4 shows an example of an arrangement for phasing transmission antennas. FIG. 4 shows implementation of antenna beams by means of a digital system. If the transmission antenna beams to be phased are implemented with an analogue phase-shift network, the power amplifiers are before the analogue beam formation matrix. Signals 400, 402, 404, 406 to each beam are pre-phased with phasing elements 408, 410, 412, 414, after which the signals are taken to a digital beam formation matrix 416, which generates antenna beams in accordance with the example of FIGS. 2*a* to 2*c*. After this, the signals are taken to power amplifiers 418, 420, 422, 424, by means of which the power of the signals is amplified for the transmission. Finally, the amplified signal is taken to antenna elements 426, 428, 430, 432 of the antenna array to be transmitted to the radio path.

Figure 5:
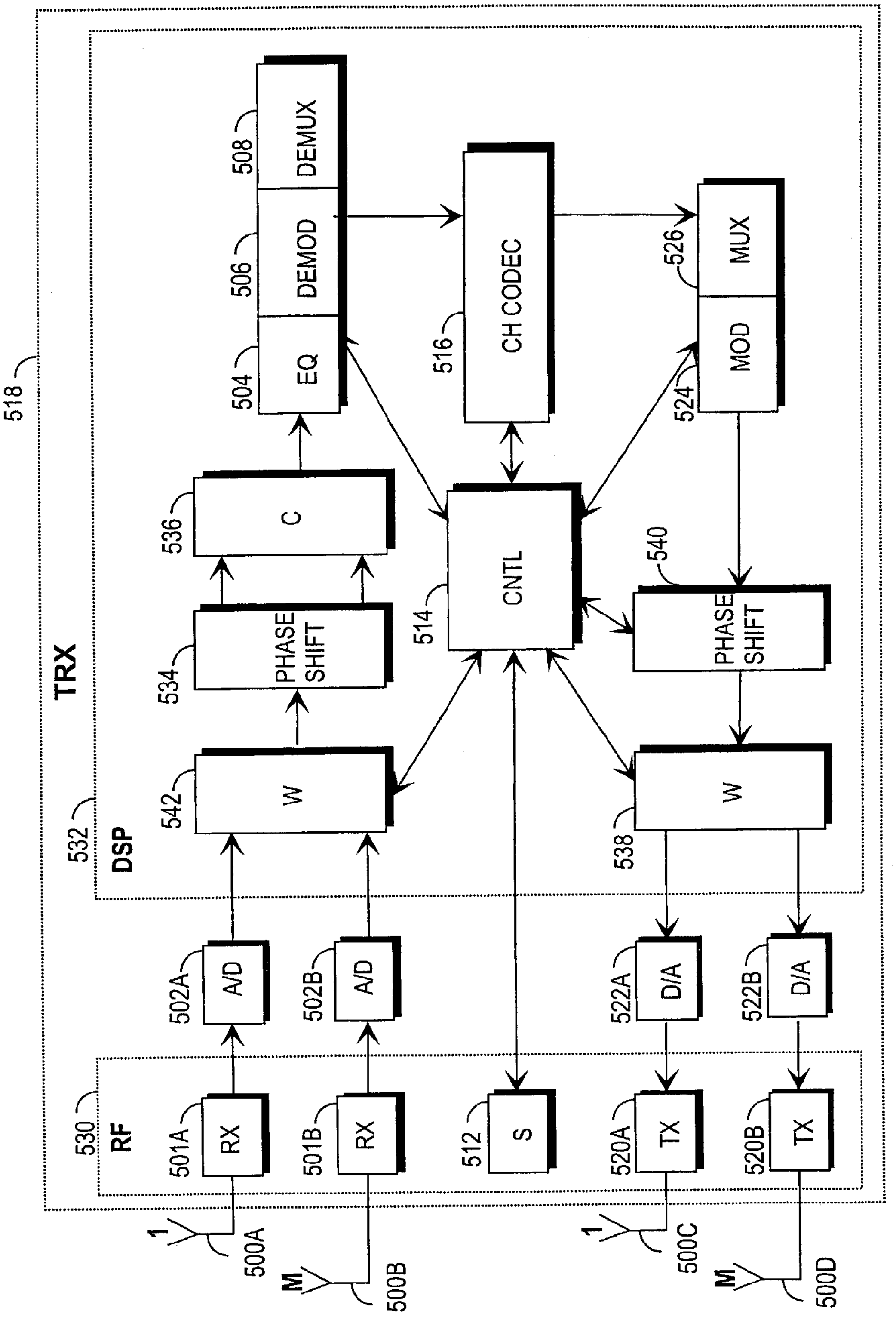
FIG. 5 illustrates an example of a transceiver.

FIG. 5 shows in more detail the structure of one transceiver 518. An antenna array using directional antenna beams comprises several separate elements 500A, 500B, for example eight different elements, the direction of the antenna beams being performed in the reception. There may be M pieces of antenna elements, whereby M is an integer greater than one. The transmission can utilize the same antenna elements as the reception, or there may be separate antenna elements 500C, 500D for the transmission, as shown in FIG. 5. Both antenna groups can also be used simultaneously in both the transmission and the reception. The antenna elements are arranged for instance in a linear or planar manner.

In a linear manner, the elements can be arranged for example as a ULA (Uniform Linear Array), in which the elements are positioned on a straight line at uniform distances from each other. In a planar manner, in turn, for example a CA (Circular Array) can be formed, in which the elements are positioned at the same level, for example in the shape of the periphery of a circle in a horizontal manner. Thus, a given part, for instance 120 degrees or even the whole of the 360 degrees, of the periphery of the circle is covered. In principle, also two- or even three-dimensional structures can be constructed of the above-mentioned uniplanar antenna structures. A two-dimensional structure is formed for instance by positioning ULA structures side by side, whereby a matrix is formed of the elements.

A multipath-propagated signal is received via the antenna elements. Each antenna element has separate receivers 501A, 501B, which are radio frequency parts 530.

The receiver 501 comprises a filter, which prevents frequencies outside the desired frequency band. The receiver 501 also comprises a low-noise amplifier. After that, the signal is converted to an intermediate frequency, or directly to a baseband frequency, the signal being sampled and quantified in an analogue/digital converter 502A, 502B.

The multipath-propagated signals expressed in a complex form are then taken to a digital signal processor with its programs 532.

The antenna shape of the received signal is directed at digital phasing of the signal, whereby the antenna elements do not have to be mechanically directional. Thus, the direction of the subscriber terminal 100, 102 is expressed as a complex vector, which is formed of an elementary unit, usually expressed as a complex figure, corresponding to each antenna element. Each separate signal is multiplied by the elementary unit of the antenna element in weighting means 542. The weighting means 542 are for instance an above-described Butler matrix or, more commonly, an M×M beam formation matrix, in which M is the number of antenna elements in the antenna array. In the phasing means 534, the signal is pre-phased with a beam-specific phasing coefficient, which comprises a weighting coefficient or a phase or amplitude coefficient. After this, the signals can be combined in combining means 536.

The pre-phasing and phasing of a signal can also be performed for a radio-frequency signal or for an intermediate-frequency signal possibly used. In such a case, the weighting coefficient means 542 are positioned in connection with radio-frequency parts 530 or between the radio-frequency parts and the analogue/digital converter 502A, 502B.

A channel equalizer 504 compensates interference, such as interference caused by multipath propagation. 504 and 536 can also be one block, for example a RAKE receiver of the CDMA system. A demolutator 506 takes a bit stream from the channel-equalized signal, which bit stream is transmitted to a demultiplexer 508. The demultiplexer 508 separates the bit stream from different time-slots to separate logic channels. A channel codec 516 decodes the bit sream of different logic channels, i.e. decides whether the bit stream is signalling information to be transmitted to a control unit 514 or whether the bit stream is speech to be transmitted to the speech codec of the base station controller 106. The channel codec 516 also performs error correction. The control unit 514 performs internal control tasks by controlling different units.

Further, if the radio system used is a wideband system, a narrow-band signal on the transmission side is spread to a wide band one and on the reception side the spread wideband signal is despread into a narrow-band one.

A multiplexer 526 indicates a time-slot for each burst in burst-form transmission. A modulator 524 modulates the digital signals to a radio-frequency carrier wave. In phasing means 540, the signal is pre-phased with a beam-specific phasing coefficient, which comprises a phase coefficient or a phase and amplitude coefficient. Thus, power balance is achieved with pre-phasing by means of maximum power waving, or intermediate beams formed between the antenna beams can be directed. In weighting means 538, the signal is multiplied by an elementary unit corresponding to each antenna element. In the weighting means 538, the signal is multiplied by an elementary unit corresponding to each antenna element. In this way, the antenna beam can be directed in digital phasing in the direction of the complex vector formed by the elementary units.

The signal is converted from digital into analogue using a digital/analogue converter 522A, 522B. Each signal component is transmitted to a transmitter 520A, 520B corresponding to each antenna element.

The transmitter comprises a filter by means of which the bandwidth is reduced. Further, the transmitter controls the output power of the transmission with power amplifiers. The synthesizer 512 arranges all required frequencies to different units. The clock in the synthesizer can be locally controlled, or it can be controlled in a centralized manner from another location, such as from the base station controller 106. The synthesizer creates the required frequencies by means of a voltage-controlled oscillator, for instance.

The above-described functional blocks, such as pre-phasing means, can be implemented in a plurality of ways, for instance with software executed by a processor, or with a hardware implementation, such as with a logic constructed of separate components or with the ASIC (Application Specific Integrated Circuit) or with an analogue phasing network.

Above, orthogonal beams are described which are provided by means of a Butler matrix according to the prior art. However, the beams do not have to be orthogonal in the pre-phasing method described above. The beams can be directed in a free manner, for example in such a way that the sector can be narrowed. Better isolation between the sectors, for instance, is achieved with narrower sectors, and thus it is also possible to generate the narrower beams in the edges of the sector. In the same way, the side beam level can be reduced.

The method can be widened to a two-dimensional antenna array, whereby the beams can be formed and directed in both the horizontal (azimuth) and elevation direction.

Although the invention has been described above with reference to the example according to the attached drawings, it is obvious that the invention is not restricted thereto but can be varied in a plurality of ways within the inventive idea defined in the attached claims.

The invention claimed is:

1. A method of forming directional antenna beams, the method comprising directing at least two antenna beam signals by means of a beam formation matrix, the method further comprising pre-phasing pre-determined antenna beam signals formed with an antenna array in such a way that the signal of at least one antenna beam has a different phase compared with the signals of other antenna beams, wherein the pre-phasing is implemented in such a way that a power of a sum signal of antenna elements is evenly distributed to different antenna elements in a pre-determined variation range.

2. A method according to claim 1, wherein the method is implemented with a pre-phasing element.

3. A method according to claim 2, wherein the pre-phasing element is a phase-shift element.

4. A method according to claim 2, wherein the pre-phasing element is a delay line.

5. A method according to claim 2, wherein the pre-phasing element comprises phasing coefficients.

6. A method according to claim 2, further comprising controlling the pre-phasing element on the basis of the results of power measurements of antenna signals performed after the beam formation element.

7. A method according to claim 2, further comprising controlling the pre-phasing element and the selection of antenna beams required for the generation of intermediate beams on the basis of the positioning measurements of the receiver.

8. A method according to claim 1, wherein a beam covering the whole sector is formed by transmitting the same signal to all antenna beams.

9. A method according to claim 1, wherein the phase of the signal of at least one antenna beam is converted in such a way that power balance or direction of power is achieved in a pre-determined manner.

10. A method according to claim 1, wherein the phase and/or amplitude of the signal of at least one antenna beam is converted in such a way that power balance or direction of power is achieved in a pre-determined manner.

11. A radio transmitter comprising a beam formation element, which beam formation element is connected to at least one pre-phasing element, by means of which pre-phasing element pre-determined antenna beam signals formed with an antenna array are pre-phased in such a way that the signal of at least one antenna beam has a different phase compared with the signals of other antenna beams, wherein the pre-phasing element comprises means for evenly distributing the power of the sum signal of the antenna elements to the different antenna elements in a predetermined variation range.

12. A radio transmitter according to claim 11, wherein the pre-phasing element is a phase-shift element.

13. A radio transmitter according to claim 11, wherein the pre-phasing element is a delay line.

14. A radio transmitter according to claim 11, wherein the pre-phasing element comprises phasing coefficients.

15. A radio transmitter according to claim 11, wherein a beam covering the whole sector is formed by transmitting the same signal to all antenna beams.

16. A radio transmitter according to claim 11, wherein the pre-phasing element converts the phase of the signal of at least one antenna beam in such a way that power balance or direction of power is achieved in a pre-determined manner.

17. A radio transmitter according to claim 11, wherein the pre-phasing element converts the phase and/or amplitude of the signal of at least one antenna beam in such a way that power balance or direction of power is achieved in a pre-determined manner.

18. A radio transmitter according to claim 11, wherein the pre-phasing element is controlled on the basis of the results of power measurements of antenna signals performed after the beam formation element.

19. A radio transmitter according to claim 11, wherein the pre-phasing element and the selection of antenna beams required for the generation of intermediate beams are controlled on the basis of the positioning measurements of the receiver.

20. A radio transmitter comprising a beam formation element, where the beam formation element is connected to at least one pre-phasing element, by means of which pre-phasing element pre-determined antenna beam signals formed with an antenna array are pre-phased in such a way that the signal of at least one antenna beam has a different phase compared with the signals of other antenna beams, wherein the pre-phasing element is configured to evenly distribute the power of the sum signal of the antenna elements to the different antenna elements in a predetermined variation range.

21. A radio transmitter comprising a beam formation element, where the beam formation element is connected to at least one pre-phasing element, by means of which pre-phasing element pre-determined antenna beam signals formed with an antenna array are pre-phased in such a way that the signal of at least one antenna beam has a different phase compared with the signals of other antenna beams, wherein the pre-phasing element is configured to direct the power of the intermediate beams formed between the antenna beams normally formed in a pre-determined direction.

22. A method of forming directional antenna beams, the method comprising directing at least two antenna beam signals by means of a beam formation matrix, the method further comprising pre-phasing pre-determined antenna beam signals formed with an antenna array in such a way that the signal of at least one antenna beam has a different phase compared with the signals of other antenna beams, wherein the pre-phasing is implemented in such a way that a power of intermediate beams formed between the antenna beams normally formed is directed in a pre-determined direction.

23. A radio transmitter comprising a beam formation element, which beam formation element is connected to at least one pre-phasing element, by means of which pre-phasing element pre-determined antenna beam signals formed with an antenna array are pre-phased in such a way that the signal of at least one antenna beam has a different phase compared with the signals of other antenna beams, wherein the pre-phasing element comprises means for directing power of intermediate beams formed between the antenna beams normally formed in a predetermined direction.

* * * * *